June 7, 1927.
J. SCHILZ
1,631,224
ELECTRICAL CONDUIT CROSSOVER SYSTEM
Filed Aug. 19, 1925    2 Sheets-Sheet 1
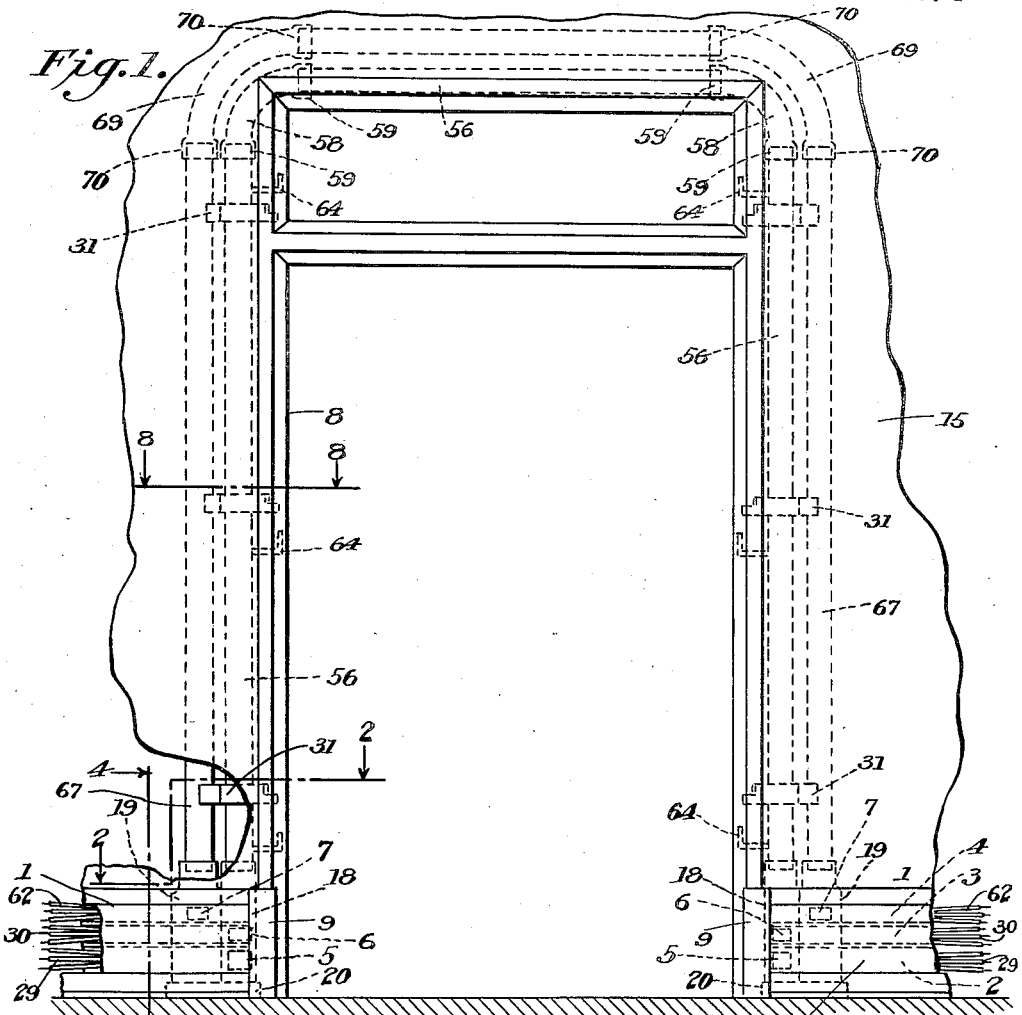
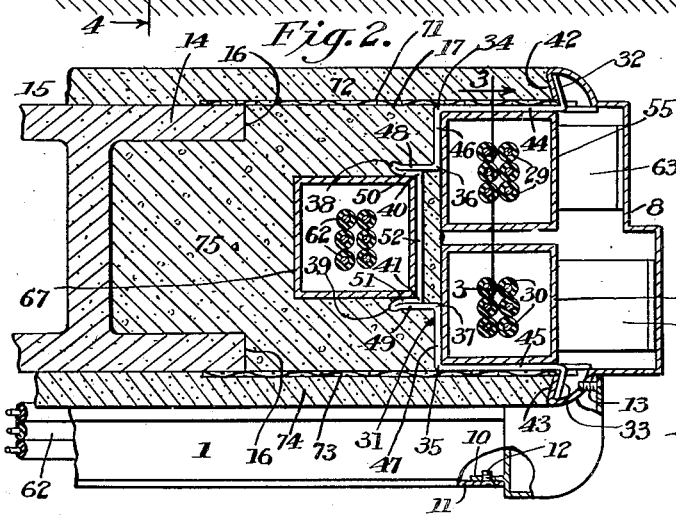
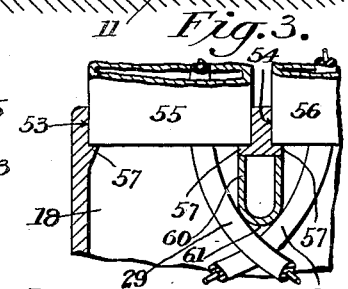
Inventor:
John Schilz,
By [signature]
Attorney.

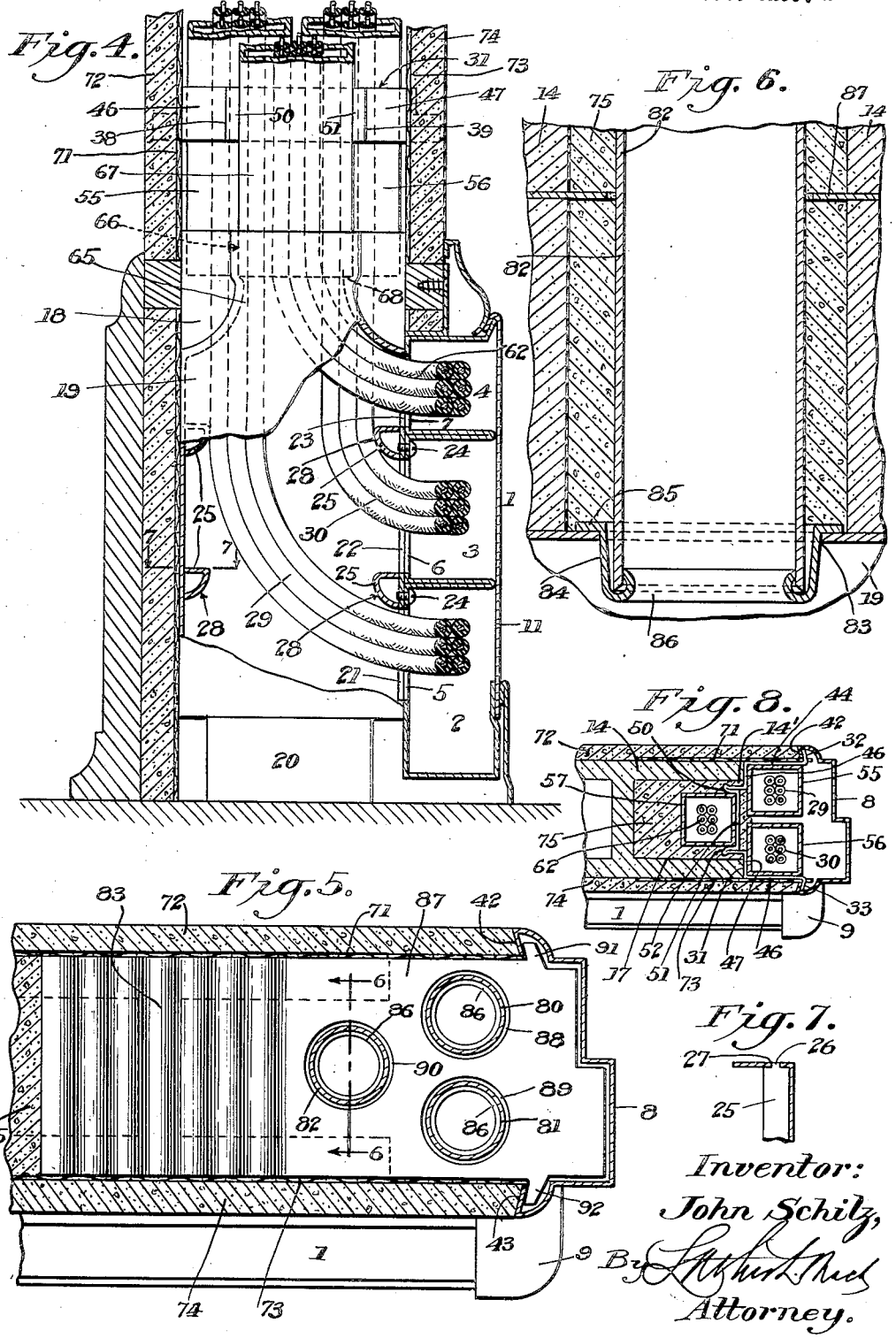

Patented June 7, 1927.

1,631,224

UNITED STATES PATENT OFFICE.

JOHN SCHILZ, OF LOS ANGELES, CALIFORNIA, ASSIGNOR OF ONE-THIRD TO GERALD MARSAC, OF LOS ANGELES, CALIFORNIA.

ELECTRICAL-CONDUIT-CROSSOVER SYSTEM.

Application filed August 19, 1925. Serial No. 51,136.

The invention relates to electrical conduits and more particularly to an electrical conduit crossover system and method for extending electrical wiring in building walls over doors and other openings therein.

In one of the present systems and methods of wiring buildings it is the practice to extend the conduits and wiring in the floor under doors or other openings in partition or other walls. In the event of removal of partition or other walls in this system and method of wiring, the conduits and wires must be cut off or removed entirely, and the floor patched or refinished which involves considerable expense.

The object in general of my invention is to provide a conduit crossover by means of which the objectionable features in wiring systems now in use will be eliminated, and a more particular object is to provide a conduit crossover in which the conduits are extended along the sides and over the top of the frame of a door or other opening in a wall, thus reducing the length of conduit and wire required in other crossovers and making it unnecessary to break any appreciable amount of tile to install the conduit.

A further object is to provide a conduit crossover of the character stated which will be simple in construction, easily assembled or installed, accessible, and considerably less expensive.

A further object is to provide a conduit crossover constructed with slip joints or connections between the parts thereof so that it may be easily and more cheaply assembled and installed.

A further object is to provide a conduit crossover constructed with larger outlet openings leading into the electrical conduit-base so that the wires may be more easily pulled through the conduits.

I have illustrated a preferred embodiment of my invention, and modifications thereof, in the accompanying drawings, in which:

Fig. 1 is an elevation of a wall and door therein showing my conduit crossover in position along the sides and over the top of the frame of the door.

Fig. 2 is a horizontal sectional view on an enlarged scale taken on line 2—2 of Fig. 1.

Fig. 3 is a fragmentary vertical sectional view taken on line 3—3 of Fig. 2, illustrating the slip joints between the outlet box and conduits, and also the chafing strip between the lower ends of said conduits.

Fig. 4 is a fragmentary vertical sectional view on an enlarged scale taken on line 4—4 of Fig. 1.

Fig. 5 is a view similar to Fig. 2, illustrating a modified form of my invention.

Fig. 6 is a fragmentary vertical sectional view on an enlarged scale of the outlet box and one of the conduits, taken on line 6—6 of Fig. 5.

Fig. 7 is a fragmentary sectional view taken on line 7—7 of Fig. 4, illustrating the means of securing the chafing strips in the outlet boxes.

Fig. 8 is a horizontal section taken on line 8—8 of Fig. 1.

Corresponding reference characters designate the same parts in all the views.

My conduit crossover is adapted for use in combination with the usual form of conduit-base indicated at 1, which is divided into a plurality of super-imposed race-ways 2, 3, and 4, there being three race-ways shown in the present construction but my invention is applicable to conduit-bases divided into one or more race-ways.

The conduit-base is provided with openings 5, 6 and 7 respectively, in the inner wall thereof, which openings lead into the race-ways 2, 3 and 4 respectively. The conduit-base 1 extends up to the lower end of the metal door frame 8 of standard construction, and the ends of said base are closed by closures 9. These closures are of slightly different construction from the standard conduit-base closures, in that they are provided with lugs 10 resting against the inside of the face plate 11 of the base and secured thereto by screws 12, while screws 13 are extended through the wall of said closures into engagement with the edge of the door frame 8, as shown in Fig. 2.

The tile or material 14 of which a wall 15 is constructed in which my invention is installed extends to a point 16 a short distance from the upright members of the frame 8 from the floor to the upper edge of the conduit-base, providing a space 17 between the frame and the tile for the purpose hereinafter described. (See Fig. 2.)

Above the conduit-base one edge web of the tile 14 is broken out, as indicated at 14' and the tile extended to a point nearer the upright and top members of the door frame 8, continuing the space 17 upwardly along the upright members and top member of the frame. (See Fig. 8.)

In the space 17 are placed outlet boxes 18 and 19 upon suitable supports 20, such as brick or other fireproof materials. The outlet boxes 18 are placed adjacent the frame 8, while the outlet boxes 19 are placed against the boxes 18. The outlet boxes 18 are provided with outlets 21 and 22, while the outlet boxes 19 are provided with outlets 23 in their side walls which coincide with the openings 5, 6 and 7 respectively, in the inner wall of the conduit-base 1. The outlet boxes are secured by screws 24 to the conduit-base 1, which screws extend through the inner wall of the boxes, conduit-base and engage the adjacent side, said screws engaging the side walls of the boxes 18 above the openings 5 and 21 and the openings 6 and 22 respectively.

Chafing strips 25 are placed against the inside of the side walls of the outlet boxes 18 at the upper edges of the outlets 21 and 22 and over the inner ends of the screws 24, said strips being secured in position by lugs 26 at their ends which project through openings 27 in opposite side walls of the outlet boxes. Said chafing strips are formed with rounded surfaces 28 extending inwardly and upwardly from the upper edges of the openings 21 and 22 against which strips the wires 29 and 30 may be drawn so that the insulation thereof will not be cut by the edges of said outlets, or by the inner ends of the screws 24, which are covered by the chafing strips.

Anchor straps 31 are hooked in the upright members of the frame 8 at suitable distances apart, one above the other. Each of said anchor straps comprises a single piece of strip metal bent outwardly at their ends into hooks 32 and 33, bent at right angles at 34 and 35, 36 and 37, bent upon themselves at 38 and 39 and at right angles at 40 and 41, the angle 40 and 41 being located inwardly from the points 38 and 39. The hooks 32 and 33 of the straps are adapted to engage the inner side of the inturned flanges 42 and 43 at the edges of the door frame 8, whereby the straps are held in position within the space 17.

The straps 31 are formed with members 44 and 45 extending from the hooks 32 and 33 respectively longitudinally of the wall to the angles 34 and 35 respectively. The strap is formed with members 46 and 47 extending inwardly transversely of the wall from the angles 34 and 35 respectively, to the angles 36 and 37 respectively. The strap is formed with members 48 and 49 extending respectively from the angles 36 and 37 at right angles to the members 46 and 47 to the bent edges 38 and 39 respectively, and the strap is bent backwardly upon itself from the edges 38 and 39 respectively, forming members 50 and 51, extending from said edges to the angles 40 and 41 respectively, and the strap is formed with a member 52 extending from the angles 40 and 41.

The outlet boxes 18 are provided with square flanged openings 53 and 54 at the top thereof to receive the lower ends of the square conduits 55 and 56 respectively, which conduits extend upwardly in the space 17 along the upright and top members of the frame 8, from one outlet box 18 to the other, and rest in the anchor straps 31 against the strap members 44 and 46 and the strap members 45 and 47 respectively. The outlet boxes are provided with shoulders 57 in the openings 53 and 54 upon which rest the lower ends of the conduits 55 and 56 whereby said conduits are supported. The sections of the conduits 55 and 56 which extend along the upright members of the frame 8 are connected by elbows 58 to the sections of the conduit extending along the top member of the frame, the elbows being connected by slip joints 59 to said sections.

Chafing strips 60 are provided in the upper part of the outlet boxes 18 between the lower ends of the conduits 55 and 56 and are formed with a lower rounded surface 61 against which the wires 29 and 30 engage, whereby the insulation is prevented from being scraped off the wires. Spacing angles 63 and 64 are secured in the upright members of the frame 8 in spaced relation one above the other, which angles engage one side of the conduits 55 and 56 and position said conduits in the inner straps 31.

The outlet boxes 19 are formed with bottle necks 65 at their upper ends and with flanged square openings 66 at the upper ends of said necks to receive the lower ends of square conduits 67, the necks being formed with shoulders 68 at the lower end of the openings 66 upon which rest the lower ends of the conduits 67 whereby said conduits are supported. The conduits 67 extend upwardly along the upright members and over the top member of the frame 8 outside of the conduits 55 and 56 and rest in the anchor straps 31 against the strap members 52 and between the members 50 and 51 of the straps, whereby the conduits 67 are anchored in position.

The sections of the conduits 67 extending along the upright members of the frame 8, and the section extending above the top member of said frame are connected by elbows 69 formed with slip joints 70 which engage the ends of said sections.

The bottle necks 65 of the outlet boxes 19 are curved to the upper edge of the openings 23 in said boxes, and the curved walls of said necks form chafing surfaces for the wires 62 when pulled through conduits 67 and openings 23 and 7 into the race-way 4 of the conduit-base, said bottle neck serving the same purpose as the chafing strips 25 and making it unnecessary to secure such strips above the opening 23 in the outlet boxes 19.

Metal lathing 71 is placed against the face of the tile 14 and against the inner edge of the flange 42 of the door frame 8, and the plaster 72 on one side of the wall is applied to the outside of said lathing. Metal lathing 73 is placed against the opposite face of the tile 14 and against the inner edge of the flange 43 of the door frame 8, and plaster 74 on the opposite side of the wall is extended and applied to the outside of said metal lathing. The plaster 72 and 74 closes the space 17 between the door frame 8 and the edge 16 of the tiling 14.

When the conduits 55 and 56 and 67 are positioned in the space 17 around the door frame 8, and as the tile 14 is being laid, the space 17 is filled with plaster, mortar, grout or other suitable fire-proof material 75, thus anchoring the conduits firmly in position.

In the modified form of my invention, shown in Figs. 5 and 6, round conduits 80, 81 and 82 are substituted for the square conduits 55, 56 and 67 respectively. The upright walls of the outlet boxes 18 and 19 are provided with round openings 83 in which are fitted ring seats 84 formed with external flanges 85 at their upper edges which rest upon the top wall of the outlet boxes, while the lower edges of the said seats are turned inwardly in the form of a bead 86.

The lower ends of the conduits 80, 81 and 82 fit in the ring seats 84 and are seated within the beads 86 whereby the conduits are supported in position, the beads 86 being rounded to form chafing strips which serve the same purpose as the chafing strips 61 and 65 in the form of my invention as above described.

Anchor plates 87 are substituted for the anchor straps 31 in the first described form of my invention, said plates are laid between the blocks of tile 14 and are provided with openings 88, 89 and 90 respectively, through which the conduits 80, 81 and 82 extend, and said plates are formed with lugs 91 and 92 for engaging the inner sides of the inturned flanges 42 and 43 of the frame 8. The plates 87 are also formed with transverse corrugations 83 which are imbedded in the mortar between the blocks of tile whereby the plates and the conduits 81 and 82 are firmly anchored in position.

The wires 29 extend from the race-way 2 of the conduit-base at one side of the door through openings 5 and 21 and through the conduit 55, and then through openings 21 and 5 into the race-way 2 of the conduit-base at the other side of the door. The wires 30 extend from the race-way 3 in the conduit-base at one side of the door through openings 6 and 22 and through conduit 56, through openings 22 and 6 into the race-way 3 of conduit-base at the other side of the door frame. The wires 62 extend from the race-way 4 of the conduit-base at one side of the door frame through openings 7 and 23, through conduit 67 and then through openings 23 and 7 into the race-way 4 of the conduit-base at the other side of the door frame.

I conceive it to be possible to change or modify my invention within the scope of the claims appended hereto without departing from the spirit thereof.

What I claim is:

1. In combination with a door and conduit-base, outlet boxes in the wall adjacent said conduit-base at opposite sides of the door respectively, said conduit-base and outlet boxes being provided with communicating openings, screws seated in the rear wall of the conduit-base and the adjacent side wall of the outlet boxes above said communicating openings for securing and grounding said outlet boxes to said conduit-base, chafing strips secured in said outlet boxes above the upper edges of said communicating openings and over the inner ends of said screws, and a conduit crossover connected to said outlet boxes and extending around the door frame adjacent the upright and top members thereof.

2. In combination with a door and conduit-base, outlet boxes in the wall adjacent said base at opposite sides of the door, said base and outlet boxes being provided with communicating openings, chafing strips formed with lugs thereon, the outlet boxes being provided with openings in their walls to receive said lugs to secure said chafing strips in the outlet boxes above said communicating openings, and a conduit crossover connected to said outlet boxes and extending over the door frame adjacent the upright and top members thereof.

3. In combination with a door and conduit-base, a pair of outlet boxes in the wall adjacent said conduit-base at opposite sides of the door, and in communication with said conduit-base, a pair of conduit crossovers connected to said outlet boxes and extending over the door adjacent the upright and top members thereof, and chafing strips in said outlet boxes between the lower ends of said conduit crossovers.

4. In combination with a door and conduit-base, outlet boxes in the wall adjacent said conduit-base at opposite sides of the door, said outlet boxes being formed with bottle neck openings at their upper ends, the walls of said bottle neck openings communicating with openings in said conduit-base and forming chafing strips for the wires, and a conduit crossover connected to said bottle neck openings of said outlet boxes and extending over the door adjacent the upright and top members thereof.

5. In combination with a door and a conduit-base, detachable end closures for the conduit-base, outlet boxes in the wall adjacent said conduit-base at opposite sides of the door, said conduit-base having openings at its ends adjacent said closures in communication with said outlet boxes, and a conduit crossover connected to said outlet boxes and extending over the door adjacent the inside of the upright and top members of the door frame.

JOHN SCHILZ.